United States Patent [19]

Miller et al.

[11] 4,150,078

[45] * Apr. 17, 1979

[54] PROCESS FOR MAKING REFRACTORY SHAPES

[75] Inventors: Eldon D. Miller, Zelienople; Ryan F. Washburn, Pittsburgh, both of Pa.

[73] Assignee: Lava Crucible Refractories Company, Zelienople, Pa.

[ * ] Notice: The portion of the term of this patent subsequent to Jun. 7, 1994, has been disclaimed.

[21] Appl. No.: 778,880

[22] Filed: Mar. 18, 1977

Related U.S. Application Data

[63] Continuation-in-part of Ser. No. 623,741, Oct. 20, 1975, Pat. No. 4,028,453.

[51] Int. Cl.² ............................................. C04B 35/66
[52] U.S. Cl. ....................................... 264/63; 264/67; 264/176 R
[58] Field of Search ................. 264/56, 67, 176 R, 63

[56] References Cited

PUBLICATIONS

Kingery, *Ceramic Fabrications Processes*, pp. 109–111 (1958).

Norton, *Refractories*, pp. 126–136 (1968).

*Primary Examiner*—Robert F. White
*Assistant Examiner*—John A. Parrish
*Attorney, Agent, or Firm*—Webb, Burden, Robinson & Webb

[57] ABSTRACT

This application relates to a process for making ceramic shapes from nonplastic size graded ceramic materials comprising the formulation of a unique batch. The batch is processed in a water-cooled pug mill-extruder to prepare a deaired and densified column. The column is cut into constant volume billets. The billets are then pressed or reformed at low pressures into uniformly sized shapes which are thereafter dried and fired to develop a ceramic bond.

4 Claims, No Drawings

PROCESS FOR MAKING REFRACTORY SHAPES

RELATED APPLICATION

This is a continuation-in-part of Application Ser. No. 623,741, filed Oct. 20, 1975 now U.S. Pat. No. 4,028,453.

This application relates to a process for making ceramic shapes and particularly relates to a process for making ceramic shapes which require close tolerances and smooth surfaces such as slide gates used in the teeming of molten metals.

The current process for making slide gates is a combination of impact (vibration) and hydraulic pressing, firing and machining. That process contains undesirable features, for example, variations from gate to gate are difficult to control. Variations result in high scrap losses and low productivity.

A process known as extrusion-repress or the stiff mud process is described, for example, in Refractories, by F. H. Norton, 3rd edition, McGraw Hill Book Company, Inc., New York (1949), pages 123–128. The stiff mud process has been used in the manufacture of shapes from plastic batches, that is, those containing a large proportion of crude clay. They require moisture contents from 8 to 20% by weight of the batch (or 18 to 40% by volume) to provide an extrudable mass. Even so, in the stiff mud process, the extrusion die is steam heated to reduce friction. Since the extruded or green density of the shapes is inherently low due to the porosity left in the shapes when the water is removed, high bulk densities must, in the instances, be gained through shrinkage during drying and firing. However, shrinkage results in distortion of the shapes. Also, the resulting product has unsatisfactory hot strength due to the inherent impurities and the mineralogical structure of the crude clay.

The process according to this invention has numerous distinct advantages over pressing and other prior art processes for forming refractory shapes from batches comprising nonplastic materials. Bulk density of each shape is high and uniform from end to end, side to side and top to bottom. Dimensional tolerances of the shapes may be closely maintained. Surface quality, detail and overall appearance are improved. Die wear and press maintenance are reduced due to the low reforming pressures and the elimination of the need for impactors. The process is especially adaptable to automatic handling and the elimination of manual labor.

The process according to this invention consists of repressing or reshaping a fully densified extruded preform prepared from a batch comprising substantially all nonplastic ceramic materials.

According to this invention, high purity, high density, volume stable extrusions are achieved from size graded ceramic raw material batches which contain no clay or only to 5% clay and preferably no more than 2% clay. The extrusions are formed at low moisture levels, for example, 3 to 4% by weight of the batch depending on the specific density of the raw materials. The size graded ceramic raw material batch is prepared from nonplastic ceramic materials such as calcined alumina or tabular alumina or other granular materials not including raw clays. Actually a very small amount of clay may be added to the batch without changing its overall nonplastic character. For example 2% kaolinitic clay or 0.5% bentonite may be usefully added to the batch. The batch should be size graded to provide typical brickmaking batches. Preferably the materials are sized at least to pass 8 mesh. Materials which are sized somewhat finer, say 14 mesh, provide good density and smoother surfaces. Continuous grind brickmaking batches and gap grind brickmaking batches are both suitable according to this invention. To these batch ingredients are added volatilized silica, for example, 2 to 10% by weight of the batch, a small quality of organic materials which provide binding and lubricating properties to the mix and a small quantity of a liquid vehicle such that the total of organic material and liquid vehicle comprise 13 to 18 volume percent of the batch. The batch is then processed in a pug mill-extruder having a water-cooled barrel and die to deair and extrude a continuous column. The column is preferably in the form of a sheet. The sheet-like column is cut to form constant volume billets having the desired volume of the reformed ceramic shapes. The billets are then pressed or reformed at low pressures into the desired shape. After drying and firing the shapes are recovered as ceramically bonded articles.

As already stated, this process is particularly applicable to the manufacture of slide gates. These gates are machined to ±0.001 inches of flatness and to provide a polished surface. Ceramic shapes prepared by the above described process require much less machining to achieve the flatness specification.

Further features and other objects and advantages of this invention will become clear from the following detailed description.

High alumina refractory slide gates may be prepared according to this invention from a mixture of tabular and calcined alumina ground to pass 14 mesh. To this is added small quantities of organic lubricants and binders which include, for example, dextrine, CMC (carboxymethyl cellulose), PVA (polyvinyl alcohol), polyethylene oxide (Polyox WSR 301) and a small quantity of water. Two percent by weight dextrine works very well as the organic lubricant and binder. With proper selection, the organic materials and vehicle may comprise between 13 and 18% by volume of the batch materials. To this is added a small quantity, for example, approximately 5% by weight of the batch volatilized silica. Volatilized silica is a form of silica recognized in the art as having an extremely fine particle size. It is generally obtained as a by-product of the reduction of silica to form silicon alloys. The batch is premixed, for example, in a wet pan and fed at a controlled rate preferably from an air-tight storage container to the pug mill extruder.

Pug mill-extruder typically having a mixing section connected to one end of an extrusion barrel. An auger lays along the bottom of the mixing section and passes into the extrusion barrel. Attached to the other end of the extrusion barrel is the die.

Applicants have found it preferably if the pug mill-extruder has an extrusion barrel length to auger diameter of at least 4:1. The extrusion barrel which contains the auger must be water-cooled and preferably is made with a replaceable liner since the auger and liner are susceptible to wear in this process. If the pug mill-extruder is not maintained at about room temperature, heat produced from friction between the batch and the machine becomes too great, and causes premature surface drying, with subsequent surface cracking of the preforms. Secured to the extrusion barrel is a transition die which is a smooth fishtail configuration having a water jacket for cooling. A straight finish die having a water jacket is secured to the transition die to provide smoother surface and to allow shimming for adjustment of the column thickness.

An extruded column 10½" by 1½" is handleable without deforming. However, the column may be cut into preforms or billets for slide gates using a "cookie cutter" type apparatus for punching out the blanks or billets.

For making a slide gate with a hole in the middle thereof, the flat rectangular blank is first cut into a preform having a volume exactly equal to the desired volume or the reformed part. The overall size of the preform is slightly smaller than the die size and the hole in the preform is slightly larger than the hole in the finished part so that the preform will fit easily into the die and over the mandrel. The hole cutter is sharpened from the inside and the exterior wall of the cutter is sharpened from the outside. This way a precision billet can be obtained. An integral spring loaded ejection plate serves to eject the preform after a force of only one ton cut the blank into the preform.

After the billet is formed by cutting from the column, it may be necessary to permit the billet to stand in the air thus permitting the surface of the billet to loose some moisture. A slight drying of the surface enable easier release of the reshaped billet from the press. However, too much drying of the surface will result in a pressed shape that has an undesirably crazed surface. Indeed, this is the reason for keeping the column at room temperature during extrusion. Otherwise, the surface of the billet cannot be kept from loosing too much moisture.

The preforms or billets are then placed in a press and pressed to size at a pressure of about 500 to 1000 psi. This is considerably less than the approximately 4000 psi necessary for dry pressing. The deaired preform is relatively incompressible. The pressure in the pressing process merely reforms the billet to the dimensions of the press box.

Because the preform is fully densified and uniform in size, the final thickness of the part can be controlled accurately. Further, the thickness of the part can be adjusted by shimming the extrusion die to increase the thickness of the column. Since the preforms are cut by cutters that have a fixed area, changing the thickness of the column changes the total volume of the preform. Thus, weighing, hand-filling and hand-leveling are eliminated.

After pressing to reform the billet, it is ejected, dried and fired.

Slide gates were made according to this process from a batch comprising 95%, by weight, tabular and calcined alumina ground to pass 14 mesh, 5% volatilized silica, and based on these inorganic ingredients, 2% dextrine and 3 to 4% water. The organic binder (dextrine) and water comprise 18%, by volume, of the entire batch. This batch was processed into slide gates as described above. After firing the slide gates had an apparent porosity of 15.4% and a modulus of rupture at 2500° F. of 1880 psi.

The process can be made entirely automatic in the sense that all operations can be done mechanically, thus eliminating manual steps. Making the process fully automatic involves the integration of the three main forming steps, extruding, preforming and repressing so that they cycle in unison. However, the process is particularly adaptable to mechanization and automation because no step requires particularly close attention by workmen. Dry pressing requires close attention because of the variability of the compaction ratio (batch volume to shape volume). Also the workpieces, according to this method, i.e., column, billet or reformed shape each have sufficient "wet" strength for mechanical handling.

Having thus described our invention with the detail and particularity as required by the patent laws, what is desired protected by Letters Patent is set forth in the following claims.

We claim:

1. A method of making a ceramic shape from a batch comprising nonplastic materials comprising raw clay wherein said raw clay is present in an amount of less than 5% comprising the steps for:
   A. preparing a batch comprising nonplastic size graded ceramic materials comprising less than 5% raw clay, 2 to 10%, by weight, volatilized silica; and 13 to 18 volume percent based on the entire batch, of organic binders, lubricants, and liquid vehicle;
   B. processing the batch in a pug mill-extruder to deair and extrude a continuous column, said pug mill-extruder having means for maintaining the temperature of the extrusion barrel of said extruder near room temperature thereby maintaining the surface of the column near room temperature while it is being extruded;
   C. cutting the column to form a billet;
   D. pressing the billet to form a shape;
   E. drying and firing to recover a ceramically bonded shape.

2. A method of making a ceramic shape from a batch comprising nonplastic materials comprising raw clay wherein said raw clay is present in an amount of less than 5% comprising the steps for:
   A. preparing a brickmaking batch comprising nonplastic size graded ceramic materials comprising less than 5% raw clay passing 8 mesh; 2 to 10% by weight volatilized silica; and 13 to 18 volume percent, based on the entire batch of organic binders and lubricants selected from the group consisting of dextrine, carboxymethyl cellulose, polyvinylalcohol, polyethylene oxide, and mixtures thereof, and water;
   B. processing the batch in a pug mill-extruder to deair and extrude a continuous column, said pug mill-extruder having means for maintaining the temperature of the extrusion barrel of said extruder near room temperature thereby maintaining the surface of the column near room temperature while it is being extruded;
   C. cutting the column to form a billet;
   D. pressing the billet to form a shape;
   E. drying and firing to recover a ceramically bonded shape.

3. The method according to claim 2, in which the billet is allowed to stand prior to pressing just long enough to loose sufficient surface moisture to enhance release of the shape after pressing but not long enough to cause crazing of the surface upon pressing.

4. The method according to claim 1, wherein the batch comprises nonplastic ceramic materials comprising less than 5% raw clay at least all passing 8 mesh.

* * * * *